United States Patent
Garahi et al.

(10) Patent No.: US 7,697,420 B1
(45) Date of Patent: Apr. 13, 2010

(54) SYSTEM AND METHOD FOR LEVERAGING NETWORK TOPOLOGY FOR ENHANCED SECURITY

(75) Inventors: Masood Garahi, Loveland, CO (US); Peter J. Stanforth, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 2128 days.

(21) Appl. No.: 10/413,567

(22) Filed: Apr. 15, 2003

Related U.S. Application Data

(60) Provisional application No. 60/372,083, filed on Apr. 15, 2002.

(51) Int. Cl.
*H04L 1/00* (2006.01)
*H04B 1/52* (2006.01)
*H04W 4/00* (2009.01)
*H04L 12/56* (2006.01)

(52) U.S. Cl. .................. 370/229; 370/328; 370/338; 370/401

(58) Field of Classification Search ......... 370/254–257, 370/328, 338, 400, 401
See application file for complete search history.

(56) References Cited

U.S. PATENT DOCUMENTS

| | | | |
|---|---|---|---|
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |

(Continued)

FOREIGN PATENT DOCUMENTS

CA 2132180 3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Pankaj Kumar
*Assistant Examiner*—Marcus R Smith
(74) *Attorney, Agent, or Firm*—Randi L. Karpinia; Joseph J. Buczynski

(57) ABSTRACT

A system and method for locating and using multiple routes to transmit sub-packets of data from a source node to a destination node in an ad-hoc network, thus preventing intermediate nodes in any one transmission path from intercepting a useful amount of information. The system and method routes communications between a source node and a destination node via multiple routes, selected in a random fashion. Further protection is achieved by breaking data packets into sub-packets requiring reassembly at the destination node.

20 Claims, 2 Drawing Sheets

U.S. PATENT DOCUMENTS

| | | | |
|---|---|---|---|
| 5,909,651 | A | 6/1999 | Chander et al. |
| 5,936,953 | A | 8/1999 | Simmons |
| 5,943,322 | A | 8/1999 | Mayor et al. |
| 5,987,011 | A | 11/1999 | Toh |
| 5,987,033 | A | 11/1999 | Boer et al. |
| 5,991,279 | A | 11/1999 | Haugli et al. |
| 6,028,853 | A | 2/2000 | Haartsen |
| 6,029,217 | A | 2/2000 | Arimilli et al. |
| 6,034,542 | A | 3/2000 | Ridgeway |
| 6,044,062 | A | 3/2000 | Brownrigg et al. |
| 6,047,330 | A | 4/2000 | Stracke, Jr. |
| 6,052,594 | A | 4/2000 | Chuang et al. |
| 6,052,752 | A | 4/2000 | Kwon |
| 6,064,626 | A | 5/2000 | Stevens |
| 6,067,291 | A | 5/2000 | Kamerman et al. |
| 6,067,297 | A * | 5/2000 | Beach .................. 370/389 |
| 6,078,566 | A | 6/2000 | Kikinis |
| 6,094,431 | A * | 7/2000 | Yamato et al. ......... 370/395.21 |
| 6,104,712 | A | 8/2000 | Robert et al. |
| 6,108,738 | A | 8/2000 | Chambers et al. |
| 6,115,580 | A | 9/2000 | Chuprun et al. |
| 6,122,690 | A | 9/2000 | Nannetti et al. |
| 6,130,881 | A | 10/2000 | Stiller et al. |
| 6,130,892 | A | 10/2000 | Short et al. |
| 6,132,306 | A | 10/2000 | Trompower |
| 6,163,699 | A | 12/2000 | Naor et al. |
| 6,178,337 | B1 | 1/2001 | Spartz et al. |
| 6,192,053 | B1 | 2/2001 | Angelico et al. |
| 6,192,230 | B1 | 2/2001 | Van Bokhorst et al. |
| 6,208,870 | B1 | 3/2001 | Lorello et al. |
| 6,223,240 | B1 | 4/2001 | Odenwald et al. |
| 6,240,294 | B1 | 5/2001 | Hamilton et al. |
| 6,246,875 | B1 | 6/2001 | Seazholtz et al. |
| 6,249,516 | B1 | 6/2001 | Brownrigg et al. |
| 6,275,707 | B1 | 8/2001 | Reed et al. |
| 6,285,892 | B1 | 9/2001 | Hulyalkar .................. 455/574 |
| 6,304,556 | B1 | 10/2001 | Haas .......................... 370/254 |
| 6,327,300 | B1 | 12/2001 | Souissi et al. ............... 375/219 |
| 6,349,091 | B1 | 2/2002 | Li |
| 6,349,210 | B1 | 2/2002 | Li .............................. 455/450 |
| 6,549,540 | B1 * | 4/2003 | Ward .......................... 370/412 |
| 6,754,192 | B2 * | 6/2004 | Kennedy ..................... 370/331 |
| 6,788,670 | B1 * | 9/2004 | Larsson ...................... 370/351 |
| 6,813,272 | B1 * | 11/2004 | An et al. ................ 370/395.21 |
| 6,831,896 | B1 * | 12/2004 | Lempio et al. .............. 370/252 |
| 6,868,083 | B2 * | 3/2005 | Apostolopoulos et al. ... 370/392 |
| 6,940,832 | B2 * | 9/2005 | Saadawi et al. ............ 370/328 |
| 6,947,379 | B1 * | 9/2005 | Gleichauf et al. ........... 370/229 |
| 7,061,924 | B1 * | 6/2006 | Durrant et al. .............. 370/401 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR LEVERAGING NETWORK TOPOLOGY FOR ENHANCED SECURITY This application claims benefit under 35 U.S.C. §119(e) from U.S. provisional patent application Ser. No. 60/372,083 entitled "A System And Method For Leveraging Mesh Network Topology For Enhanced Security", filed on Apr. 15, 2002, the entire contents of which is incorporated herein by reference.

BACKGROUND OF THE INVENTION

1. Field of the Invention

The present invention relates to a system and method for locating and using multiple routes to transmit sub-packets of data from a source node to a destination node while preventing intermediate nodes in any single transmission path from intercepting a useful amount of information for malicious purposes. The system and method routes communications between a source node and a destination node via multiple routes, selected in a random fashion. Further protection is achieved by breaking data packets into sub-packets requiring reassembly at the destination node.

2. Description of the Related Art

In recent years, a type of mobile communications network known as an "ad-hoc" network has been developed. In this type of network, each user terminal (hereinafter "mobile node") is capable of operating as a base station or router for other mobile nodes, thus eliminating the need for a fixed infrastructure of base stations. Accordingly, data packets being sent from a source mobile node to a destination mobile node are typically routed through a number of intermediate mobile nodes before reaching the destination mobile node.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet.

Details of these types of ad-hoc networks are described in U.S. Pat. No. 7,072,650 B2 entitled "Ad Hoc Peer-to-Peer Mobile Radio Access System Interfaced to the PSTN and Cellular Networks", granted on Jul. 4, 2006, in U.S. Pat. No. 6,807,165 B2 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 B2 entitled "Prioritized-Routing for an Ad-Hoc, Peer-to-Peer, Mobile Radio Access System", granted on Mar. 29, 2005, the entire content of each of said patents being incorporated herein by reference.

As can be appreciated by one skilled in the art, when a node sends packetized data to a destination node, the node typically performs a calculation to determine whether the destination node is contained in its routing table. If the destination node is contained in the node's routing table, the data is transmitted via a path that leads to the destination node. If the destination node is not listed in the node's routing table, then the packet is sent to one or more other nodes which are listed in the node's routing table, and each receiving node then determines if the destination node is listed in their respective routing tables. This process continues until the data packet eventually reaches the destination node.

Routing data packets from node to node however, poses several security concerns. In an ad-hoc network, a node may arbitrarily connect to another node or transition through any number of nodes to communicate with a final destination. However, transmission security concerns often requires the consideration of node security when selecting routing nodes from a routing table. Certain networks, such as the Internet and mobile ad-hoc networks, rely on having multiple diverse routes between a source and a destination for reliability and robustness. In practice, there are multiple acceptable routes between the source and the destination at any given time. Current routing algorithms use a number of metrics to decide what is the best route between the source and the destination, and this route is used until it becomes incapable of meeting the performance criteria. Once this occurs, an alternate route is selected and implemented.

One of the biggest security concerns of a network of this type regards an intermediate node, between the source node and the destination node, which is able to detect data within routed packets (i.e. "sniff" the packets) and, by inference, can use this intercepted information for some malicious purpose. Accordingly, a need exists for a system and method for effectively and efficiently preventing intermediate nodes in a transmission path from intercepting useful amounts of transmitted information.

SUMMARY OF THE INVENTION

An object of the present invention is to provide a system and method for locating and using multiple routes from a source node to a destination node to prevent an intermediate node in any single transmission path from improperly intercepting and diverting a useful amount of information.

Another object of the present invention is to provide a system and method to alternate between different transmission paths, either upon each transmission, or at random transmission intervals which are calculated to allow a certain number of consecutive packets to use a single route before selecting a different route.

Another object of the present invention is to provide a system and method for breaking data packets into sub-packets prior to transmission such that an intermediate node in any single transmission path will have difficulty in intercepting and diverting an entire packet.

These and other objects of the present invention are substantially achieved by providing a system and method for establishing a variable communication path between a source node and a destination node. The node set comprising the variable communication path is redefined at various intervals to prevent any single node from participating in a sufficient number of transmission paths to intercept a complete data packet or series of packets. Redefining the node set creates different transmission paths via different participating nodes. The node set can be redefined after each packet transmission, or after a random number of packets have been communicated via the single path. Additionally, any single data packet can be further divided into a plurality of data sub-packets prior to communication, such that the capture and assembly of an entire data packet by a node is made more difficult.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
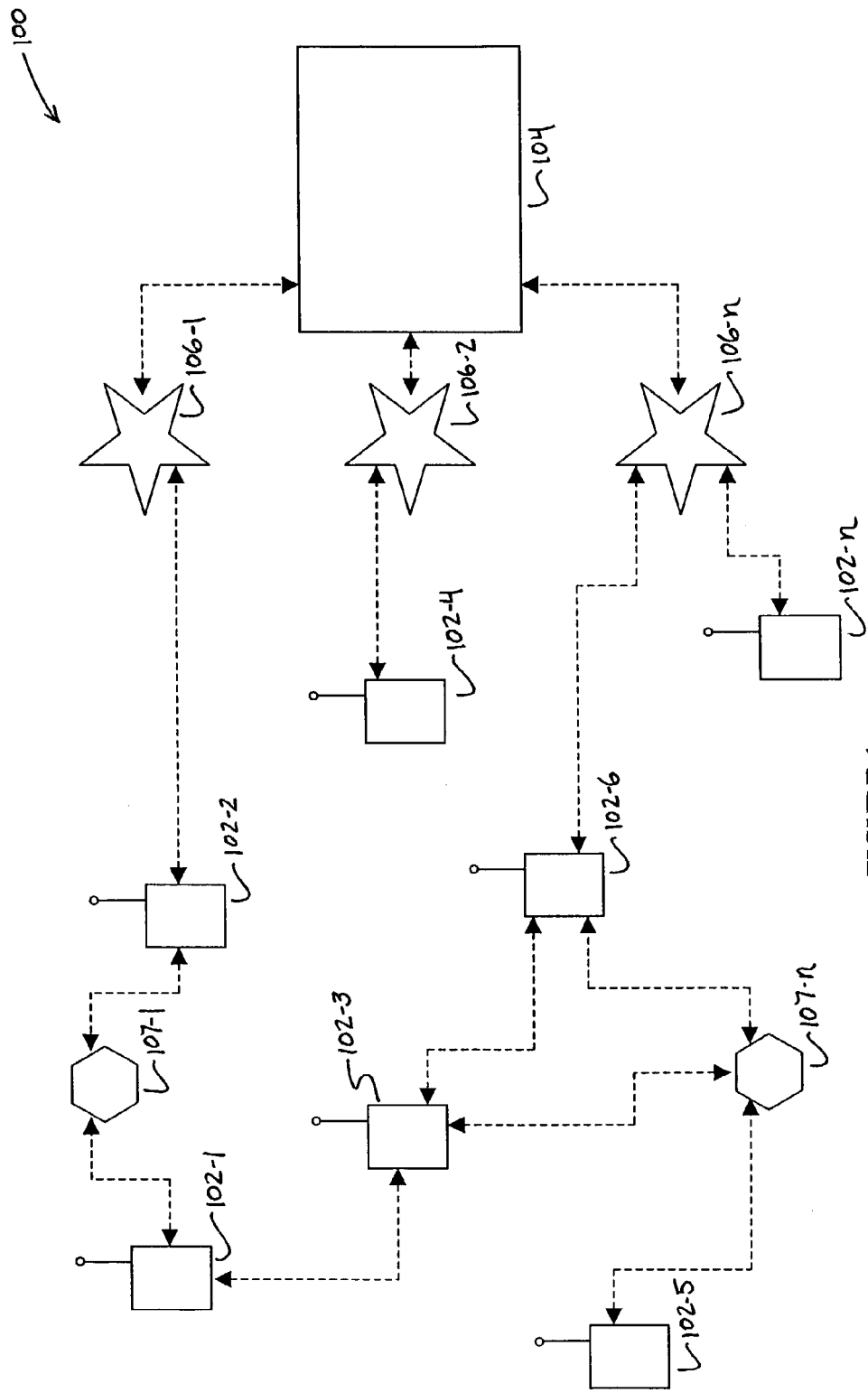
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
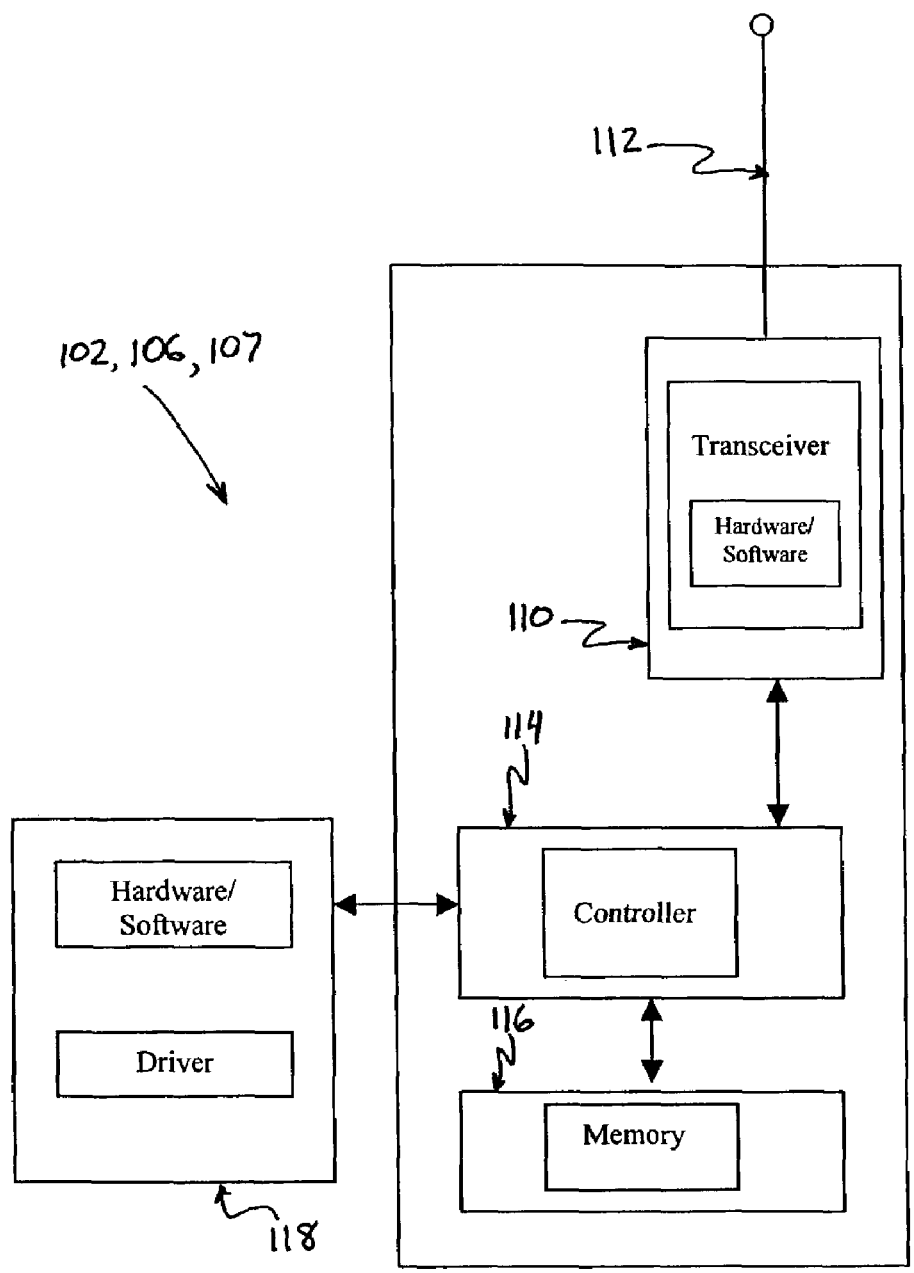
FIG. 2 is a block diagram of an example of a mobile node employed in the network shown in FIG. 1.

As can be appreciated by one skilled in the art, the nodes 102, 106 and 107 are capable of communicating with each other directly, or via one or more other nodes operating as a router or routers for data packets being sent between nodes, as described in U.S. Pat. No. 5,943,322 to Mayor, which is incorporated herein by reference, and in U.S. Pat. Nos. 7,072, 650 B2, 6,807,165 B2, and 6,873,839 B2, referenced above. Specifically, as shown in FIG. 2, each node 102, 106 and 107 includes a transceiver 110 which is coupled to an antenna 112 and is capable of receiving and transmitting signals, such as packetized data signals, to and from the node under the control of a controller 114. The packetized data signals can include, for example, voice, data or multimedia information.

Each node 102, 106 and 107 further includes a memory 116, such as a random access memory (RAM), that is capable of storing, among other things, routing information pertaining to itself and other nodes in the network. Each of nodes 102, 106 and 107 periodically exchange respective routing information, referred to as routing advertisements or routing table information, via a broadcasting mechanism, for example, when a new node enters the network, or when existing nodes in the network move. During such exchanges, a node 102, 106 or 107 will broadcast routing table updates and nearby nodes will receive the broadcast routing table updates if within broadcast range (e.g., radio frequency (RF) range) of the broadcasting node. For example, assuming that nodes 102-1 and 102-6 are within the RF broadcast range of node 102-3, when node 102-3 broadcasts routing table information the current table information is received and filed by both nodes 102-1 and 102-6. However, if nodes 102-2, 102-4 and 102-5 are beyond the broadcast range of node 102-3, these nodes will not receive the current table information broadcast.

In a multi-hop wireless ad-hoc routing network 100, a routing algorithm transmitted by a node 102, 106 and 107 may advertise all other nodes with which that node can directly communicate and can be referred to as neighbor nodes. In addition, the routing algorithm transmitted by a node 102, 106 and 107 typically advertises all of the destinations that can be reached from that node and the next node to which a packet must be delivered to in order to reach those destinations. In doing so, the routing algorithm assists in the establishment of a routing path.

In an ad-hoc network, such as network 100 of FIG. 1, nodes 102, 106 and 107 may arbitrarily connect to or transition through any number of other nodes during communication. A typical routing path consists of a source node, possibly multiple intermediary nodes and a destination node. The embodiment of the present invention described below, greatly reduces the risk of malicious interception of the complete transmission data packet by intermediary nodes. As stated above, a significant security concern regarding ad-hoc network communication exists where an intermediate node, between a source and destination node, is able to "sniff" information packets that are being transferred and, by inference, use this intercepted information for some malicious purpose.

The embodiment of the present invention prevents this interference by taking advantage of the multiple routes from a source node to a destination node derived in network to minimize the risk of intercepted information. In another embodiment of the present invention, two or more such techniques can be combined to make it effectively impossible for a node in the middle of the transmission route to intercept useful amounts of information. Each technique may be used individually, or in any combination to secure the transmission path.

In a first embodiment, the present invention directs the communication of data packets between a source node and a destination node via randomly selected different routes. The routes are "different" from one another based on varying the individual nodes with which each route is composed. For example, as shown in FIG. 1, one route between node 104 and node 102-1 can be constructed using nodes 106-1, 102-2 and 107-1, finally reaching node 102-1. A different route can be constructed using nodes 106-n, 102-6 and 102-3. In other networks having a much higher density of nodes 102, 106 and 107, and where such nodes can be in motion, it can be seen many different routes can exist between source and destination node.

Randomly selected different routes makes it much more difficult for an intermediate node within the communication route to have an opportunity to access more than a small percentage of the transferred packets. In the example described above, node 102-2 is present in the first route, but absent from the second route. This prevents a node, such as 102-2, from intercepting complete information for some malicious purpose. While routing every packet differently (i.e. via a different route) is one technique achieved using the embodiment described, the route can also be changed at variable packet transmission increments in a second technique.

In the first technique, a different route is used for each data packet. This can provide a higher degree of protection as the number of consecutive packets any single node can see is reduced to near zero. However, in applications in which a minimal number of consecutive packets may be routed through a single node, a second technique can be used.

In the second technique, a different route is used only after a series of data packets has been transmitted via the first route. The series of data packets which are allowed to travel via a single route can be based on a variable function at the originating node. The variable function defines the number of data packets which can be transmitted via a single route before the route should be changed for subsequent data packets. The variable function however, should not be predictable, such as requiring a route change after every 4 packets for example, and should preferably be random.

This variable function is performed at the routing layer and can be configurable between "0" and "n", where "0" turns off the function and "n" is the maximum number of consecutive packets that can travel over the same route before the route is changed. As "n" represents the maximum number of consecutive packets that can travel over the same route before the route is changed, the variable function directs the changing of routes at consecutive packet increments of (n-α), where α represents a random variable, between the values of 0 and n-1, selected by the variable function.

In operation, this second technique directs the selection of an initial route and an initial value of consecutive packet increments (n-α) is calculated. Upon completion of (n-α) packet transmissions via the first route, a second route is selected and a new random variable α is selected by the variable function value for the calculation of a new consecutive packet increments (n-α) value. The process repeats until all packets have been transmitted.

In a second embodiment, the present invention directs one or more nodes at the media access control (MAC) layer, to break each data packet into sub-packets before transmission, and then employing either the first or second technique of the first embodiment described above. The packets are divided, or broken up, such that large packets are sent as several smaller packets, or sub-packets, and a different route can be used for each data sub-packet, or a different route can be used only after a series of data sub-packets have been transmitted via a first route. In each case, the chances of all the sub-packets of a single packet being sent by the same route, and therefore reassembled into useful information by an intermediate node within the communication route, is made extremely low.

As noted above, randomly selected different routes make it more difficult for an intermediate node to access more than a small percentage of the transferred packets and the source node will typically maintain information regarding multiple paths from which routes are selected. In cases where random path selection is not fully possible due to limited information at the source node, the present invention can direct a warning as to possibly compromised security.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for securing communications from unintended access in an ad-hoc communications network, said network including a plurality of nodes for transmitting and receiving signals to and from other nodes in said network, the method comprising:
   determining multiple routes from a source node to a destination node, wherein each of the multiple routes is different from one another based on varying at least one intermediate node with which each of the multiple routes is composed;
   establishing a plurality of variable communication paths each comprising one of the multiple routes between the source node and the destination node for at least one data packet transmission;
   dividing each data packet into a plurality of data sub-packets; and
   communicating each of the plurality of data sub-packets via a unique associated variable communication path, wherein each intermediate node in each of the multiple routes of the associated variable communication paths is prevented from intercepting all of the at least one packet of data.

2. A method as claimed in claim 1, further comprising:
   varying at least one intermediate node with which each of the multiple routes is composed by excluding each intermediate node previously used in at least one of the multiple routes.

3. A method as claimed in claim 2, further comprising:
   replacing said excluded intermediate node with a node not previously used in at least one of the multiple routes.

4. A method as claimed in claim 1, further comprising:
   varying at least one intermediate node with which each of the multiple routes is composed to prevent at least one intermediate node of each of the multiple routes to have access to at least two consecutive data sub-packets.

5. A method as claimed in claim 1, further comprising:
   varying at least one intermediate node with which each of the multiple routes is composed to prevent at least one intermediate node of each of the multiple routes to have access to at least a variable number of consecutive data sub-packets.

6. A method as claimed in claim 5, further comprising:
   calculating said variable number of consecutive data sub-packets based on a variable function performed at a routing layer.

7. A method as claimed in claim 5, further comprising:
   calculating said variable number of consecutive data sub-packets as a random number ranging between a lower limit and an upper limit value.

8. A method as claimed in claim 1, wherein said division occurs at a media access control layer.

9. A method as claimed in claim 1, further comprising:
   reassembling said plurality of data sub-packets into said data packet at said destination node.

10. A system for securing communications from unintended access in an ad-hoc communications network, said network including a plurality of nodes for transmitting and receiving signals to and from other nodes in said network, the system comprising:
    a first node, for determining multiple routes from a source node to a destination node, wherein each of the multiple routes is different from one another based on varying at least one intermediate node with which each of the multiple routes is composed;
    said first node further for establishing a plurality of variable communication paths each comprising one of the multiple routes between the source node and the destination node for at least one data packet transmission; and
    said first node further for dividing each data packet into a plurality of data sub-packets and communicating each of the plurality of data sub-packets via a unique associated variable communication path, wherein each intermediate node in each of the multiple routes of the associated variable communication paths is prevented from intercepting all of the at least one packet of data.

11. A system as claimed in claim 10, wherein:
    said first node varies at least one intermediate node with which each of the multiple routes is composed by excluding each intermediate node previously used in at least one of the multiple routes.

12. A system as claimed in claim 11, wherein:
    said first node replaces said excluded intermediate node with a node not previously used in at least one of the multiple routes.

13. A system as claimed in claim 10, wherein:
    said first node varies at least one intermediate node with which each of the multiple routes is composed to prevent at least one intermediate node of each of the multiple routes to have access to at least two consecutive data sub-packets.

14. A system as claimed in claim 10, wherein:
said first node varies at least one intermediate node with which each of the multiple routes is composed to prevent at least one intermediate node of each of the multiple routes to have access to at least a variable number of consecutive data sub-packets.

15. A system as claimed in claim 14, wherein:
said first node further for calculating said variable number of consecutive data sub-packets based on a variable function performed at a routing layer.

16. A system as claimed in claim 14, wherein:
said first node further for calculating said variable number of consecutive data sub-packets as a random number ranging between a lower limit and an upper limit value.

17. A system as claimed in claim 10, wherein said division occurs at media access control layer.

18. A system as claimed in claim 10, wherein:
said first node reassembles said plurality of data sub-packets into said data packet at said destination node.

19. A method, comprising;
determining multiple routes from a source node to a destination node for at least one data packet transmission, wherein each of the multiple routes is different from one another based on varying at least one intermediary node with which each of the multiple routes is composed;
dividing each data packet into a plurality of data sub-packets;
selecting a first one of the multiple routes to transmit a first data sub-packet from the source node to the destination node and communicating the first data sub-packet via the first one of the multiple routes; and
selecting a second one of the multiple routes to transmit a second data sub-packet from the source node to the destination node and communicating the second data sub-packet via the second one of the multiple routes, thereby preventing an intermediate node in any of the multiple routes from intercepting complete packet of data.

20. A method comprising:
dividing a communication into a plurality of data packets;
determining multiple routes from a source node to a destination node for each of the plurality of data packets, wherein each of the multiple routes is different from one another based on varying at least one intermediary node with which each of the multiple routes is composed;
dividing each data packet into a plurality of data sub-packets;
selecting a first one of the multiple routes to transmit a first series of data sub-packets from the source node to the destination node and communicating the first series of data sub-packets via the first one of the multiple routes; and
selecting a second one of the multiple routes to transmit a second series of data sub-packets from the source node to the destination node and communicating the second series of data sub-packets via the second one of the multiple routes, thereby preventing an intermediate node in any of the multiple routes from intercepting complete packet of data.

\* \* \* \* \*